3,081,276
OIL-CONTAINING POLYMERIC COMPOSITIONS AND PROCESS FOR PREPARING SAME
John L. Snyder, Long Beach, Kendall W. Barbee, Torrance, and Norman Reginald Legge, Walnut Creek, Calif., assignors to Shell Oil Company, New York, N.Y., a corporation of Delaware
No Drawing. Filed Feb. 8, 1960, Ser. No. 7,139
10 Claims. (Cl. 260—33.6)

This invention relates to improved processes for the recovery of elastomers. More particularly it relates to the recovery of synthetic elastomers from hydrocarbon solutions thereof.

It is known that conjugated dienes may be polymerized to produce elastomers having a high content of the cis 1,4-addition product. The more useful of the cis 1,4-addition products are those prepared from isoprene and butadiene as they have properties that make them particularly suitable for the manufacture of automobile and truck tires and other applications where natural rubber is used. The prior art directed to the polymerization of conjugated dienes to produce cis 1,4-addition products is well known and will not be described in great detail here. It is sufficient to mention that cis 1,4-polyisoprene may be produced by polymerizing isoprene with any of a large variety of hydrocarbyl lithium catalysts. Particularly preferred are the alkyl lithiums as n-butyl lithium, amyl lithium and other normal alkyl lithiums having from 2 to 10 carbon atoms. Such polymerizations are conducted at temperatures ranging from about 25° C. to about 100° C. at ambient pressures. The quantity of catalyst employed may be as low as 0.3 millimole per mole of isoprene and may be as high as 2 millimoles per mole of the isoprene.

The cis 1,4-polybutadiene is best prepared with a catalyst that is the reaction product of a transition metal compound, particularly halides, of a group IV to VIII metal and a strong reducing agent. The reducing agent may be, for example, a metal compound, particularly organometallic, of a group I–III metal. Of the numerous reducing agents that may be employed organo-aluminum compounds are favored and are most often described as being useful to produce the polybutadiene having a high content of the cis 1,4-addition product. Fairly representative catalyst compositions for this purpose include the following reaction products:

$TiCl_3$—$AlEt_2Cl$         $CoCl_2$—$AlEt_2Br$
$VaCl_3$—$AlEt_3$          $CoCl_2$—$AlEt_3$
$TiCl_3$—$AlEt_3$          $CoCl_2$—$AlBu_3$
$TiCl_3$—$ZnEt_2$          $ZrBr_2$—$AlBu_2Cl$
$TiCl_4$—$AlBu_2Cl$        $NiCl_2$—$AlCl_3$—$AlEt_2Cl$

Still many other combinations are known for the formation of cis 1,4-polybutadiene but it may be stated that transition metal halides of group IV, particularly of titanium, are preferred for use with organo-aluminum compounds. As in the case of isoprene, the polymerization temperatures range from about 25° C. to about 100° C. at ambient pressure, and the mole ratios are such that more often the metal halide is present in molar excess of the organo-metallic compound.

Another class of highly useful elastomers are the copolymers of ethylene and propylene which are produced by polymerizing a mixture of the monomers with a catalyst comprising the reaction product of vanadium oxychloride and a reducing agent of the type previously described.

The elastomers are produced under conditions that exclude atmospheric impurities particularly oxygen and water. Additionally, impurities as sulfur, sulfur-containing compounds, oxygen-containing compounds, and the like are also to be excluded if a polymer is to be obtained that falls within the useful rubber range. The polymerizations are conducted in the presence of liquid inert diluents as isopentane, hexane, gasoline, benzene, toluene and the like. As the polymerization proceeds the elastomer forms and remains in solution until it is to be recovered. Until recently the recovery of the elastomer in a suitable manner has not been possible. A practical method of recovery of the elastomers is described in co-pending application Serial No. 802,128, filed March 26, 1959. The present invention provides still better processes for the recovery of the elastomers from hydrocarbon solutions thereof. Before considering the invention in detail it will be useful to a better understanding of the invention to consider some of the problems involved in the recovery of the elastomers.

The elastomers that are in solution of a hydrocarbon diluent may be recovered by adding to the solution a coagulating agent as isopropanol, ethanol, acetone, or the like, whereupon the polymer coagulates as a crumb. The crumb is recovered and then dried whereby the solvent and coagulating agent are removed. Unfortunately, much of the solvent and coagulating agent remains dissolved or occluded in the elastomer and these liquids are extremely difficult to remove in an economical fashion. Removal of these liquids to about less than 1%, by weight, is necessary or else they will cause rubber products to blister and weaken during vulcanization. Actually, it is best to remove the liquids to less than 0.5%, by weight, or lower but this must be done economically. The difficulty is that the coagulated crumb is rather impermeable so that occluded liquids are extremely difficult to drive out during drying without damaging the elastomer. Furthermore, when the crumb is subjected to heat during drying it becomes tacky thereby causing greater compaction and holds the liquids still more firmly.

It is an object of this invention to provide processes for the recovery of elastomers from hydrocarbon solutions thereof. It is another object to effect such a recovery of the elastomer as a driable crumb which is substantially free of hydrocarbon solvent. It is yet another object of this invention to recover elastomer from hydrocarbon solutions as a crumb which is substantially tack-free. Other objects will become apparent as the description of the invention proceeds.

These and other objects are accomplished in the process for the recovery of synthetic elastomers from hydrocarbon solutions thereof comprising admixing and dissolving a compatible oil, which is described more fully hereinafter, in the hydrocarbon solution of the elastomer to form a homogeneous solution. Thereafter the solution is treated to coagulate and recover the elastomer from the solution. The coagulated elastomer will then exist as a crumb that is substantially tack-free. A surprising finding is that the elastomer crumb is not only substantially tack-free but it exists as distinct individual particles that facilitates complete and thorough drying. Because the oil and elastomer exist as true solutions before coagulation, thorough and complete mixing is simple. Additionally, the coagulated crumb may contain substantial amounts of the oil homogeneously blended into the crumb so that the present invention additionally provides a method for extending the elastomers with compatible oils. It is therefore, another object of the invention to provide novel processes for extending synthetic elastomers with compatible oils, the elastomers being initially contained in hydrocarbon solutions, which solutions are stable and homogeneous at ordinary temperatures and are essentially free of water.

As previously indicated the synthetic elastomer at the beginning of the present processes is in the form of a true solution in an inert hydrocarbon diluent. The polymerization processes, which result in the stable solutions, form no part of this invention and it is to be noted that the stable solutions are the normal form of the starting material. This is, in practice, quite important because the physical and chemical properties of the elastomers are preserved because it is not necessary to subject the elastomers to high temperatures, which causes degradation in order to place the elastomers in solution. In actual practice of this invention, the concentration of the elastomer in the solvent is immaterial although it may range from about 3 to about 35% solids, by weight, and more usually within the range of about 10 to 25%, by weight. Because the elastomer solution is usually quite viscous it is advantageous to put the oil into the hydrocarbon solution of the elastomer by first preparing a hydrocarbon solution of the oil in a separate vessel and the thus prepared solution is mixed with the elastomer solution. However, the oil may be mixed directly with the elastomer solution. The mixture of elastomer solution and compatible oil, either as a solution or in the free state, are blended until a homogeneous composition is obtained. Thereafter the elastomer may be recovered as a solid crumb by feeding the solution into a vessel containing hot water and/or steam at temperatures above the boiling point of the hydrocarbon solvent. Alternatively, the elastomer may be recovered by mixing the elastomer solution with a coagulating agent of the type previously described.

The oils that are employed in the present processes are referred to in the art as "compatible oils" or "compatible rubber extending oils." These terms simply mean that the oil is miscible in the elastomer and after having been mixed into the elastomer they remain forever homogeneously mixed in the elastomer. That is to say that the oils do not migrate to the surface of the final composition.

Among the compatible oils are those ordinarily derived from petroleum although they may be derived from coal tar or any other suitable source. Generally, they have a viscosity of from about 10 cs. at 210° F. up to more or less solid materials softening at about 100 to 200° F., have a boiling point of at least 300° F. at 10 mm. Hg and have a specific gravity (60/60° F.) of about 0.9 to 1.05. These are primarily higher hydrocarbons and may be vacuum distillates of petroleum as well as extracts and/or raffinates of such distillates. Also suitable are residues of petroleum distillation operations. The preferred oils are the high boiling extracts of petroleum. These extracts are obtained by extracting petroleum with solvents having preferential selectivity for aromatics, and naphthenes. To obtain such extracts, various non-reactive, highly polar, aromatically preferential solvents are used such as liquid sulfur dioxide, phenol, cresylic acid, furfural, beta,beta'-dichloroethyl ether, nitrobenzene and the like. Combination solvents like phenol with cresylic acid, or liquid sulfur dioxide with benzene or toluene are sometimes used. The use of the so-called double solvent process employing mutually immiscible solvents such as phenol and propane give excellent extending oils. Many of such extracts are obtained as by-products from manufacture or lubricating oils, and thus are commercially available in very large quantities. Particular reference is made to extracts from bulk vacuum distillate fractions or cuts from California, Mid-Continent or Gulf Coast crudes used in manufacturing lubricating oils by solvent refining methods. Especially suited are extending oils of this type known as highly aromatic oils and aromatic oils by R.F.C. According to the Rostler method of analysis (Ind. Eng. Chem., 41, 598 (1939)), such highly aromatic processing oils contain about 10 to 25% nitrogen bases extractable with 85% sulfuric acid, about 12 to 28% group I unsaturated hydrocarbons extractable with 97% sulfuric acid, about 15 to 40% group II unsaturated hydrocarbons extractable with 106.75% sulfuric acid, and about 5 to 15% saturated hydrocarbons. Likewise, such aromatic coils contain up to about 12% nitrogen bases, about 8 to 21% group I unsaturated hydrocarbons, about 48 to 65% group II unsaturated hydrocarbons and about 15 to 32% saturated hydrocarbons. Very suitable oils boil above about 300° F. at 10 mm. Hg pressure and contain at least 60%, by weight, of hydrocarbons extractable by sulfuric acid of about 95 to 110% strength after extraction of nitrogen bases by 85% sulfuric acid therefrom, the extractions being conducted at about 25° C.

Still another group of petroleum oils are the paraffins which may be similar to the naphthenics except that they have a higher proportion of saturates as determined by the Rostler method of analysis. In addition to the oils of the above type, a great variety of other compatible oils may be employed including rosin oil, tall oil, pine tar, cottonseed oil, wood rosin, soy bean oil, linseed oil and other compatible oils. In considering the compatible oils, it will be understood that the oil must be compatible and non-volatile at the milling temperature which may be varied within a wide range. Normally rubber milling temperatures range from about 100° F. to about 350° F. and accordingly the compatible oil is non-volatile within these temperatures.

Of all the compatible oils a certain few are more preferred than others because they provide the best combination of ease of processing to produce an essentially tack-free, porous, easily driable crumb, desirable properties of the final product and low cost. These oils are the above described naphthenic oils and paraffinic oils and in this regard it is known that the matter of desirable properties of the final product will depend largely on the ability of the elastomeric composition to pass through the drying operation without undergoing dekradation. The preferred oils have the combined ability to cause or result in a good porous crumb which suitably withstands the usual drying conditions and yet not suffer harmful degradation. It is because of the possibility of degradation during drying that stabilizers are beneficially employed in the elastomeric compositions. However, not all stabilizers can be used because of severe staining. The present invention oddly enough, has synergistic stabilization properties with sulfur containing stabilizers as is described more fully in co-pending application Serial No. 25,222, filed April 28, 1960.

Because the recovery of the elastomer is a more troublesome problem, the present invention essentially is directed to improvements in the recovery techniques. However, the fact that the present process may also be employed to extend the elastomer is an added benefit, but the ultimate purpose intended will control the quantity of oil that is employed. In general, extending the elastomers at the production level is not undertaken because fabricators or rubber products often prefer to compound their products according to their own specifications, but the present invention, because of its simplicity and ease in which the oils are incorporated may advantageously be used to produce custom-made oil-extended product. If the oil is to function only for the purpose of producing the tack-free, porous, easily driable crumb, small amounts of the oil are used. In the latter case the oil may be as low as 0.5 part per hundred, based on the solid elastomer. Lower amounts may be used but the crumb may require longer drying times. Amounts in the order of about 1 to about 6 parts per hundred are preferred because a good, easily driable crumb is found to be most suitably prepared at such levels. At higher levels, the elastomer may take on aspects of an extended product which levels may range up to 300 phr. depending on the oil and elastomer. By way of illustration, cis 1,4-polybutadiene will continue to exhibit excellent characteristics even though it is extended within the order of about 200 parts of the more preferred oils. On the other hand, cis 1,4-polyisoprene can easily tolerate about 100 parts per hundred but after that larger amounts adversely effect the physical properties.

In considering the amount of the oil to be employed, it is first necessary to determine the solids content of the elastomer solution and this can be easily determined by removing a sample of the elastomer solution from the reactor, coagulating it with a polar solvent such as a lower alcohol or acetone, separating the solid fraction, drying and weighing it. Thereafter the amount of oil is added based on the calculated solids content.

The recovery of the elastomeric crumb from the homogeneous solution of the elastomer and the oil is simply accomplished, for example, by injecting the elastomer solution, below the liquid level of a vessel containing hot water with agitation. The water is at a temperature that is higher than the boiling point of the solvent of the elastomer solution. The solvent is flashed and the coagulated crumb floats to the top of the water layer where it is skimmed or recovered by other suitable means. Thereafter, the crumb may be squeezed to remove most of the water and the wet crumb is then dried. Because the oils required in the present processes have rather high boiling points they will not be separated from the elastomer during the coagulating process. However, if the elastomer crumb is recovered by coagulating with a polar solvent such as a lower normally liquid alcohol, acetone, or the like, some of the oil may be dissolved in the coagulating medium. Depending upon the temperature of this coagulating medium and/or the residence time of the crumb in the medium, the amount of oil that can be removed may be substantial. However, a surprising finding of the present invention is that the crumb is still recovered in a form which is essentially tack-free, porous, and readily driable even though oil may be leached out by the polar coagulation agent. The reasons for this are not understood and it appears that the presence of the oil after the coagulation step is not needed in order to maintain the drying properties of the elastomer. This finding, however, is of no practical significance if the elastomer is to contain large amounts of the oil as an extender in which event coagulation with the polar liquids will not be employed. Further the cost of recovery with polar solvents is higher than recovery by injecting in hot water.

The invention is described in greater detail in the examples. In considering that part of the examples directed to the polymerization processes, it will be appreciated that considerable variation may be undertaken in the polymerization, which forms no part of this invention.

EXAMPLE I

A solution of naphthenic oil of the type previously described in isopentane is prepared by charging to a vessel containing 1000 pounds of isopentane with 1000 pounds of naphthenic oil. The oil employed has the trademark name of "Dutrex 33" and is supplied by the Shell Oil Company. The mixture is agitated until a withdrawn sample shows that the oil is completely dissolved in the solvent. The thus prepared solution is then added in the required amount to an isopentane solution of cis 1,4-polyisoprene in a different vessel. The cis 1,4-polyisoprene solution is prepared by charging a polymerization vessel with commercial isopentane (95% isopentane and 5% n-pentane) followed by charging 2,080 pounds of isoprene so that the total charge constitutes 16.5%, by weight, of isoprene. Thereafter 0.4 pound of n-butyl lithium is added to the reactor and with continuous agitation the polymerization begins. The polymerization vessel is closed to the atmosphere and the several materials are charged so that they do not come in contact with the air. Because of an exotherm, the temperature rises to about 55–65° C. and the pressure developed in the reactor reaches about 32 p.s.i.g. After about 1⅓ hours the polymerization is complete and a sample withdrawn from the elastomer solution is coagulated by mixing with isopropanol. The coagulated elastomer contains about 92% of the cis 1,4-addition product and has an intrinsic viscosity of 8.4 dl./gram measured in toluene at 25° C. By the coagulation, the solids chontent of the polymer in the solution is determined to be 16.5% by weight and to this solution is added sufficient oil solution to provide various amounts of oil, by weight, based on the solids of the polyisoprene solution. The two solutions are thoroughly blended for a few hours to provide a homogeneous mixture. Thereafter the elastomer is coagulated by feeding the elastomer solution into a vessel containing hot water at 160° F. The solid cis 1,4-polyisoprene floats to the top of the vessel and is recovered as a crumb of discrete particles which are substantially tack-free. During the drying operation the crumb remains as discrete particles and is recovered as such and contains about .2% of volatile liquid consisting mainly of water. The drying is at 175° F. for 60 to 90 minutes. In companion observations, when elastomer solution that has not been blended with the oil is subjected to the coagulation, the elastomer crumb is recovered in large chunks which, after drying, contain much occluded isopentane and water, i.e., about 8%, by weight. Some results with the oil are shown in Table I.

Table I

| Naphthenic oil, phr.[1] | Dried Crumb, I.V.[2] | I.V. of Crumb, Aged at 80° C. | | |
|---|---|---|---|---|
| | | 5 hrs. | 10 hrs. | 20 hrs. |
| 0 | 7.6 | 6.0 | 5.8 | 5.1 |
| 1 | 8.0 | 6.8 | 6.0 | 5.6 |
| 3 | 8.2 | 6.0 | 5.9 | 5.7 |
| 5 | 8.2 | 6.2 | 5.9 | 5.5 |
| 10 | 8.2 | 6.7 | 6.4 | 6.1 |
| 15 | 8.4 | 7.0 | 6.2 | 6.5 |
| 30 | 8.3 | 8.0 | 7.8 | 7.2 |

[1] The oil is "Dutrex 33," a trademark of Shell Oil Company.
[2] The I.V. is corrected for the oil content.

The above heat treatments at 5, 10 and 20 hours are intended to simulate extended aging conditions. It will be noticed that the dried crumb with the oil shows essentially no reduction in I.V. after having passed through a drier at 175° F. for 60–90 minutes. On the other hand, elastomer that contained no naphthenic oil has substantially reduced I.V. It is thus seen that another advantage of this invention is that the oil functions to stabilize the elastomer through the drying operations. In the above examples, the elastomer contains 1.0%, by weight, of the rubber stabilizer "Antioxidant 2246," a product of the American Cyanamid Company.

The dried crumb from Example I is compounded into tread vulcanizate stock as follows:

| | Parts |
|---|---|
| Cis 1,4-polyisoprene (including oil) | 100 |
| Stearic acid | 4 |
| Zinc oxide | 5 |
| HAF carbon | 50 |
| Sulfur | 2 |
| Phenyl-beta-naphthyl-amine | 1 |
| N-cyclohexyl-2-benzo-thiazole sulfonamide | 1 |

The milling is carried out at 50° C. for 10 minutes and the cure is at 135° C. for 45 minutes. The following properties are recorded for blends with varying amounts of naphthenic oil and aromatic oil which are added prior to coagulation. For comparison, comparative data for natural rubber stock is given but for the natural rubber, 5 parts of pine tar is added in place of the oil. The aromatic oil is incorporated into the elastomer in the same manner as the naphthenic oil.

Table II

| Property | Naphthenic Oil | | | Natural Rubber [1] | Aromatic Oil, 15 phr. |
|---|---|---|---|---|---|
| | 1 phr. | 15 phr. | 30 phr. | | |
| Tensile Strength, p.s.i. | 3,400 | 3,470 | 2,730 | 3,800 | 3,090 |
| 300% Modulus, p.s.i. | 2,060 | 2,080 | 1,460 | 2,200 | 1,740 |
| Elongation, percent | 500 | 490 | 530 | 500 | 525 |
| Hardness, ISO | 69 | 67 | 62 | 74 | 68 |
| Tear (Angle), p./in. | 300 | 385 | 360 | 500 | 325 |
| Rebound, percent | 44 | 47 | 42 | 36 | 37 |
| Resilience, percent | 77 | 80 | 77 | 67 | 73 |
| Cut Growth, Kc./in. | 200 | 341 | 297 | 200-400 | 282 |
| Hysteresis Temp. Rise, °C. | 17 | 16 | 15 | 22 | 18 |
| Tensile Strength (100° C.), p.s.i. | 2,100 | 1,960 | 1,450 | 2,130 | 1,720 |
| Tear (Angle) (100° C.), p./in. | 260 | 257 | 283 | 390 | 303 |
| Raw Mooney, ML-4 | 51 | 40 | 26 | 44 | 53 |
| Compound Mooney, ML-4 | 60 | 74 | 47 | 51 | 68 |

[1] With 5 phr. pine tar.

Still better results than those shown are obtained with the aromatic oil if larger amounts of stabilizers are employed.

In the same way, the paraffinic oils may be employed. It is to be noted, however, that the paraffinic oils are more preferred than the aromatic oils because their vulcanizate properties are superior even without large amounts of stabilizers. The significance of this is that considerable cost saving is obtained because the few stabilizers that are truely suitable are quite costly. It will thus be seen that an important advantage of this invention is the over all cost savings that are afforded.

EXAMPLE II

Cis 1,4-polybutadiene, as a solution in benzene, is prepared by polymerizing a saturated solution of butadiene in benzene with a catalyst consisting of the reaction product of titanium trichloride and aluminum diethylchloride in a mole ratio of 2.5:1. For this case an oil solution is prepared in benzene and the solution is blended into the polybutadiene solution in an amount in the order of 5%, by weight, of the cis 1,4-polybutadiene. The oil is an asphaltic oil having a saybolt-furol viscosity at 210° F. of 46 seconds, a S.G. at 60° F. of 0.96 and viscosity index of 72.0. The recovered crumb, after drying at 180° F. for 90 minutes, is tack-free and contains about 0.1% water and only a trace of benzene. Because the benzene has a higher boiling point than the solvent of the previous example, the hot water used for the coagulation of the elastomer is at a temperature ranging from 200-208° F. Additionally, the residence time of the crumb in the hot water vessel is longer. These modifications remove about 98% of the benzene from the wet crumb. The cure properties of the elastomer are excellent.

EXAMPLE III

The procedure of Example II is repeated except that the oil is added in an amount of 300 p.h.r. The recovered crumb is tack-free and readily dried to contain less than 0.5% water and benzene. The cured properties of the rubber are satisfactory.

EXAMPLE IV

The procedures of Example I directed to the addition of oil and the recovery of the elastomer are repeated in all respects except that the elastomer is an amorphous copolymer of ethylene and propylene in heptane. The oil is the naphthenic oil and it is added in an amount of 3%, by weight, of the solid elastomer. The elastomer solution is prepared by charging to a 5 liter vessel one liter of dry, oxygen-free heptane and one millimole of triisobutyl aluminum. Thereafter, the heptane is saturated with a mixture of ethylene and propylene by bubbling a mixture of the gases through the heptane. The mixed gases are in a mole ratio of ethylene to propylene of 1:2.5. Thereafter, .3 millimole of vanadium tetrachloride is added and the polymerization starts soon thereafter. The various components are charged under conditions that prevent contact with the atmosphere and with constant agitation. During the polymerization there is a slight exotherm and the polymerization is carried out at 50° C. As the polymerization continues, the solution becomes increasingly viscous and after about 30 minutes the polymer solution is recovered by the same procedure described in Example I. The water-wet ethylene-propylene copolymer is recovered as a crumb of discrete particles which are porous, elastomeric and non-tacky. Analyses indicate that the copolymer contains about 50% of polymerized ethylene.

From the foregoing it will be seen that the present invention is capable of considerable modification not only in the choice of compatible oil but also in the techniques employed for the polymerization to produce the synthetic elastomers. In regard to the latter, a particular modification which is readily adaptable to the process of this invention is the production and use of elastomeric copolymers of ethylene and one other mono-alpha olefin having in excess of 3 carbon atoms. Greater disclosure on the preparation of such copolymers is found in Irish patent application 695/56, published January 9, 1957. Irrespective of the modifications, it will be seen that the present invention requires essentially that the synthetic elastomer be soluble in normally liquid hydrocarbon solvents in all proportions at normal temperatures and pressures. If the elastomers do not meet this requirement then the blending of the compatible oil into the elastomer becomes extremely difficult particularly if the elastomer is required to be dissolved at high temperatures, which temperatures are harmful to the final vulcanized product. Other modifications may be employed which modifications will be readily apparent to persons skilled in the art.

We claim as our invention:

1. The process for producing a solid substantially tack-free crumb of a synthetic elastomer of the group consisting of polyisoprene, polybutadiene and copolymers of ethylene and propylene from solutions thereof in an inert hydrocarbon solvent consisting essentially of mixing the hydrocarbon solution of the elastomer with 1–30 p.h.r. hydrocarbon extender oil for the elastomer as the sole anti-tack agent until a homogeneous solution thereof is obtained and thereafter coagulating the elastomer by mixing the solution with water at a temperature above the boiling point of the solvent.

2. The process of claim 1 wherein the oil is dissolved in an inert hydrocarbon solvent and the two solutions are mixed.

3. The process of claim 2 wherein the hydrocarbon solvents are the same.

4. The process of claim 1 wherein the elastomer is the cis 1,4-addition product of isoprene.

5. The process of claim 1 wherein the elastomer is the cis 1,4-addition product of butadiene.

6. The process of claim 1 wherein the elastomer is an amorphous copolymer of ethylene and propylene.

7. A composition consisting essentially of a homogeneous solution of a synthetic elastomer of the group consisting of polyisoprene, polybutadiene and copolymers of ethylene and propylene and 1–30 phr. hydrocarbon extender oils as the sole anti-tack agent for the elastomer dissolved in a hydrocarbon solvent, the solution being essentially anhydrous, said elastomer being soluble in normally liquid hydrocarbon solvents in all proportions at normal temperatures and pressures.

8. The composition of claim 7 in which the elastomer is cis 1,4-polyisoprene.

9. The composition of claim 7 in which the elastomer is ethylene-propylene copolymer.

10. The composition of claim 7 in which the elastomer is cis 1,4-polybutadiene.

References Cited in the file of this patent

UNITED STATES PATENTS

| | | |
|---|---|---|
| 2,319,634 | Sauser | May 18, 1943 |
| 2,325,979 | Sarbach | Aug. 3, 1943 |
| 2,360,895 | Sarbach | Oct. 24, 1944 |
| 2,778,807 | Boggs et al. | Jan. 22, 1957 |
| 2,821,515 | Jaros | Jan. 28, 1958 |
| 2,908,672 | Jackson | Oct. 13, 1959 |
| 2,999,822 | Pfau et al. | Sept. 12, 1961 |